United States Patent [19]

Sherif et al.

[11] 4,137,178

[45] Jan. 30, 1979

[54] PHOSPHORUS-NITROGEN-SILICA COMPOSITION AS A FLAME RETARDANT

[75] Inventors: Fawzy G. Sherif, Spring Valley; Mazin R. Irani, Tarrytown, both of N.Y.

[73] Assignee: Stauffer Chemical Company, Westport, Conn.

[21] Appl. No.: 748,430

[22] Filed: Dec. 8, 1976

[51] Int. Cl.$^2$ .............................................. C09K 3/28
[52] U.S. Cl. ................................ 252/8.1; 106/15 FP; 428/921

[58] Field of Search .................... 252/8.1; 106/15 FP; 428/921

[56] References Cited

U.S. PATENT DOCUMENTS

| 3,940,516 | 2/1976 | Gierek et al. | 252/8.1 X |
| 3,975,560 | 8/1976 | Daigle et al. | 252/8.1 X |

Primary Examiner—Stephen J. Lechert, Jr.
Attorney, Agent, or Firm—Roger S. Benjamin

[57] ABSTRACT

An insoluble phosphorus-nitrogen-silica flame retardant composition having a crystal structure similar to Form V ammonium polyphosphate.

14 Claims, No Drawings

PHOSPHORUS-NITROGEN-SILICA COMPOSITION AS A FLAME RETARDANT

BACKGROUND OF THE INVENTION

This invention relates to a phosphorus-nitrogen-silica composition as a flame retardant for use in epoxies, foams, paints and other substrates.

Flame retardant compositions incorporating ammonium polyphosphates are known in the art. For example, U.S. Pat. No. 3,733,289 to Burns et al. discloses a fire retardant intumescent coating composition for metallic substrates comprising an organic resin, an organic solvent, a carbonific, an ammonium phosphate, asbestos and diatomaceous earth. Japan Kokai 50-10329 (1975) to Okada discloses a fireproof paint characterized as containing phosphates, silicic acid or silicates, ammonium silico phosphate, an amino resin and a solvent.

The present invention deals with a flame retardant composition which comprises a phosphorus-nitrogen-silica composition capable of imparting flame retardancy to the vehicle or substrate with which it is incorporated, for example, epoxy resins, urethane foams, paints and the like.

DETAILED DESCRIPTION OF THE INVENTION

In accordance with the present invention, an insoluble flame retardant composition is obtained by impregnating diatomaceous earth with polyphosphoric acid, ammoniating the mixture to neutralize the acid and then heating under an ammonia atmosphere to form the insoluble product. The ammoniation can be carried out by contacting with gaseous ammonia at the surface, or with liquid ammonia by direct addition. The product is then calcined, in the presence of ammonia, at a temperature varying from about 300° to about 390° C., more preferably about 330° to about 360° C., to produce a dry, insoluble particulate composition, having a crystalline structure similar to Form V ammonium polyphosphate.

The dry composition can then be ground to a discrete particle size to enable its convenient dispersion throughout the substrate for which it is intended to impart flame retardancy. This composition was found capable of imparting excellent flame retardant properties to epoxy systems, polyurethane foams and latex paints.

The insoluble phosphorus-nitrogen-silica flame retardant composition of the present invention can also be prepared from water soluble ammonium phosphate flame retardants, such as for example, Victamide® (sold by Stauffer Chemical Company), by solution impregnating the water soluble flame retardant on diatomaceous earth, then drying to remove the solvent. A particularly desirable solvent is water. The drying operation can be carried out at any convenient temperature, for example, 120° C. The dried product is then heated at a temperature varying from about 300° to about 390° C., in contact with ammonia, for example, under an ammonia blanket for about 2 to about 6 hours, more preferably 4 hours, thus rendering the product insoluble.

The insolubility of the flame retardant composition of the present invention is extremely important for its contemplated uses. For example, a water soluble flame retardant would have dubious utility in paints, or other coating applications. In this regard, the ability of the process of the present invention to render a soluble flame retardant insoluble, provides a degree of versatility for utilizing soluble flame retardant materials in applications where they were previously precluded.

The phosphorus-nitrogen-silica flame retardant composition of the present invention can also be prepared from spent catalyst used in the production of propylene oligomers, cumene and other alkylation and condensation reactions. The catalyst used therein is polyphosphoric acid on a silica support. The silica support is generally in the form of kieselguhr. This catalyst is generally utilized in an extruded form, and after a period of time loses its mechanical strength, and is discarded. The catalyst contains about 50 to about 60 weight % $P_2O_5$, of which all or part of the $P_2O_5$ is capable of solubilizing in water to form phosphoric acid.

Consequently, disposal of the spent catalyst by burial in the ground has become unacceptable because of its tendency to be leached by water to form phosphoric acid. Current legislation also proscribes this manner of disposal by limiting the phosphorus level in underground water.

Thus, a practical way for dealing with the problem of disposing the spent phosphorus containing catalyst is to convert it into the insoluble flame retardant composition of the present invention. No special preparation is required other than removing the carbon present on the catalyst. This can be accomplished by any convenient means, such as by oxidizing the carbon to carbon dioxide, by heating at an elevated temperature and the like. As is readily apparent, fresh catalyst can also be used, and does not present any purification problems. Furthermore, the use of fresh oligomerization catalyst appears to be an economically viable and expedient means for producing the composition of the present invention.

The insoluble flame retardant composition of the present invention generally exhibits a solubility varying from about 0.01 to about 1 weight percent, or preferably about 0.1 to about 0.5 weight percent. The solubility is generally determined by dissolving one gram of the composition in 99 grams of water, stirring the slurry, separating the undissolved solid, drying and weighing. The difference in weight represents the solubility.

The flame retardant composition of the present invention will have the following analysis:

| Component | Weight % (approx.) |
| --- | --- |
| Phosphorus (as $P_2O_5$) | 30–70 |
| Silica ($SiO_2$) | 15–50 |
| Nitrogen (N) | 1–15 |

In paints, the flame retardant composition is generally incorporated in amounts varying from about 1% to about 10%, more preferably from about 3% to about 5% elemental phosphorus by weight, to be an effective flame retardant.

When incorporated in epoxy resins, the flame retardant composition is best utilized in amounts varying from about 0.05 to about 5%, or preferably from about 0.1 to about 3% elemental phosphorus by weight, to be an effective flame retardant.

In foams, the flame retardant composition is generally incorporated in amounts varying from about 0.1 to about 5%, more preferably 0.5 to about 3% elemental phosphorus by weight, to be effective.

In the above applications, greater amounts of the flame retardant composition can be incorporated in the respective substrates, however, no particular advantage is accrued thereby.

In the examples which follow, all parts and percentages are by weight, unless otherwise noted.

EXAMPLE 1

350 grams of polyphosphoric acid having a concentration of 83% $P_2O_5$ by weight were heated to 180° C. and slowly contacted with 200 grams of Celite FC TM (Johns-Manville Co.) diatomaceous earth over a period of 30 minutes while stirring in a Hobart mixer. The Celite FC diatomaceous earth had the following properties:

| | |
|---|---|
| Surface Area, Square meters/gram | 20 |
| % $SiO_2$ by wt. | 86 |
| % $Al_2O_3$ by wt. | 3.8 |
| Percent Loss on Ignition | 3.6 |
| Specific Gravity | 2.10 |
| Maximum retained on 150 mesh screen, % | 0.60 |

Gaseous ammonia was contacted with the polyphosphoric acid-diatomaceous earth mixture at a rate of about 50 cubic centimeters per second while mixing was continued until the pH of the reaction mixture reached a value between about 6 and about 7, at which time the ammonia addition was discontinued. The reaction temperature reached about 220° C. The reaction product, in the form of fine, round particles averaging about 0.01 mm. diameter, was transferred into a 3 inch diameter stainless steel reactor heated in a fluidized sand bath held at a temperature of about 340° C. (650° F.). When the reaction temperature of the mixture inside the reactor reached about 343° C., gaseous ammonia at a rate of 5 cubic centimeters per second was contacted with the mixture for a period of about 4 hours. The product was cooled, milled and sieved through a screen of 325 mesh size.

The product was a Form V ammonium polyphosphate, containing amorphous silica, having a neutral pH, low water solubility, and was light grey in color. Its water solubility was about 0.1 grams per 100 grams of solution at room temperature. The solubility was determined by magnetically stirring a slurry of one gram of the product and 99 grams of water at room temperature for an hour, followed by separating the solid by centrifuge, drying at 130° C. and weighing. The pH of the slurry of one gram of the product in 100 grams of solution was about 6. The x-ray diffraction pattern consisted mainly of lines identical to those of Form V ammonium polyphosphate. See C. Y. Shen, N. E. Stahlheber and D. R. Dyroff, *J. Amer. Chem. Soc.*, Vol. 91, No. 1, Pg. 62 (1969). The x-ray diffraction data is tabulated below.

The chemical analysis of the product showed it to contain 49.5% $P_2O_5$ and 38.5% $SiO_2$.

| X-Ray Diffraction Data* of Composition - Form V Ammonium Polyphosphate (Main Identifying Peaks) | | |
|---|---|---|
| 2θ | dA° | I/Io |
| 13.13 | 6.7371 | 48 |
| 13.60 | 6.5053 | 58 |
| 16.02 | 5.5276 | 100 |
| 16.90 | 5.2417 | 44 |
| 21.80 | 4.0734 | 32 |
| 24.40 | 3.6449 | 38 |
| 26.18 | 3.4010 | 44 |

*Copper K alpha radiation

Form V ammonium polyphosphate x-ray diffraction patterns are characteristic of the composition of the present invention, which exhibits properties of high flame retardancy and low solubility.

EXAMPLE 2

A limiting oxygen index (LOI) test to measure flame retardancy was conducted on the product of Example 1 in the following manner: Two grams of the product were mixed with 20 grams of Shell Epon 828 TM epoxy resin, and 2.6 grams of triethylene tetramine catalyst. This is equivalent to 1.75 weight % elemental phosphorus. The mixture was poured in a Teflon ® (Dupont Co.) coated test tube and left to cure overnight at room temperature, after which the temperature was raised to 110° C. for an additional four hours. The cured epoxy mixture formed rods which were removed from the test tubes and ignited in atmospheres having different oxygen/nitrogen ratios.

The LOI is defined as the maximum oxygen concentration at which the flame on the sample self-extinguishes within one minute. In brief, this procedure directly relates flame retardancy to a measurement of the minimum percentage concentration of oxygen in an oxygen:nitrogen mixture which permits the sample to burn; the LOI being calculated as follows:

$$LOI = \frac{(O_2)}{(O_2) + (N_2)} \times 100$$

Thus, a higher LOI is indicative of a higher degree of flame retardancy. These values are then compared to control samples made of rods containing no flame retardants. See also ASTM D-2863, also described by Fenimore & Martin in *Modern Plastics* (Nov. 1966).

The control rod with no flame retardant had an LOI of 20-21. The epoxy rods with the ammonium polyphosphatediatomaceous earth flame retardant composition of the present invention had an LOI of about 33.2.

The LOI of the flame retardant composition of the present invention can be expected to vary from about 22 to about 35, and higher, depending upon the amount of flame retardant incorporated into the particular substrate.

EXAMPLE 3

The flame retardant properties of the composition of Example 1 were demonstrated in a series of flammability tests of rigid urethane foams. A total of 6 urethane foam formulations were prepared. Two different foam formulations contained the flame retardant product of Example 1. For comparison purposes, two foam formulations were made containing a commercial phosphonate based flame retardant, Fyrol 6 ® (Stauffer Chemical Company), and two foams, without any flame retardant, were used as controls. Each of the foam formulations was prepared by mixing the components together with a high speed stirrer blade rotating at about 3,000 rpms. The mixed formulation was then poured into a square receptacle measuring about 8"×8"×5". The foam was aged for three days to insure a complete cure and was cut into strips for performing the LOI test in accordance with ASTM 2863. The respective foam formulations are listed below in Table 1. Table 2 tabulates results for the respective LOI's.

TABLE 1

| Component | Foam Formulations Weight - Grams | | | | | |
|---|---|---|---|---|---|---|
| | 1 | 2 | 3 | 4 | 5 | 6 |
| Sucrose polyol[1] | 83.8 | 65.9 | 90.1 | — | — | — |
| Amine crosslinked polyol[2] | 20.9 | 16.5 | 22.5 | — | — | — |
| Amine aromatic polyol[3] | — | — | — | 108.1 | 84 | 114.7 |
| Silicon Surfactant[4] | 1.5 | 1.5 | 1.5 | 1.5 | 1.5 | 1.5 |
| Fluorocarbon 11B[5] | 45 | 45 | 45 | 45 | 45 | 45 |
| Polymeric Isocyanate[6] | 127.5 | 137.6 | 138.9 | 127.8 | 137.5 | 137.2 |
| Phosphonate based flame retardant[7] | — | 30.5 | — | — | 30.5 | — |
| Triethylene diamine[8] | 3 | 3 | 3 | — | — | — |
| Flame Retardant from Example 1 | 17.4 | — | — | 17.4 | — | — |

[1] Multranol 4034 (Mobay Chemical Co.)
[2] Multranol 4051 (Mobay Chemical Co.)
[3] Thanol R650X (Jefferson Chemical Co.)
[4] DC 193 (Dow Corning)
[5] Pennwalt Co.
[6] Mondur MR (Mobay Chemical Co.)
[7] Fyrol 6 (Stauffer Chemical Company)
[8] Dabco 33LV (Houdry Co.)

TABLE 2

| Foam Formulation Samples | Flame Retardant in Foam - Wt. % | Elemental Phosphorus in Foam, wt. % | LOI |
|---|---|---|---|
| 1 (Invention) | 5.8 | 1.25 | 22.8 |
| 2 (Comparison) | 10.2 | 1.25 | 23.5 |
| 3 (Control) | — | — | 20.7 |
| 4 (Invention) | 5.8 | 1.25 | 23.5 |
| 5 (Comparison) | 10.2 | 1.25 | 24.1 |
| 6 (Control) | — | — | 21.5 |

The results of the foam tests demonstrate that the composition of the present invention is an efficacious flame retardant in rigid urethane foams.

EXAMPLE 4

In a procedure identical to Example 1, 200 grams of Dicalite SA-3 ™ diatomaceous earth purchased from Grefco Inc. were substituted for the Celite FC diatomaceous earth. Properties of Dicalite SA-3 are tabulated below:

| | |
|---|---|
| Surface Area, square meters/gram | 60 |
| % $SiO_2$ by wt. | 83 |
| % $Al_2O_3$ by wt. | 4.6 |
| % Loss on Ignition | 5.3 |
| Specific Gravity | 2.00 |
| Maximum retained on 325 mesh screen | 3.00 |

The product exhibited an x-ray diffraction pattern corresponding to Form V ammonium polyphosphate, shown in Example 1. It had a water solubility of 0.5 grams/100 grams solution and an LOI of 29.35 in Shell Epon 828 ™.

EXAMPLE 5

100 grams of Victamide ®, a highly water-soluble ammonium phosphate flame retardant containing about 76 weight % $P_2O_5$ and about 22 weight % $NH_3$, sold by Stauffer Chemical Company, was contacted with 150 grams of water. The solution was contacted with 100 grams of Celite 219 ™ (a calcined diatomaceous earth sold by Johns-Mansville Inc.) The mixture was dried at 120° C. for about 4 hours, then heated at about 340° C. for about 6 hours under an ammonia blanket, maintained with a flow of ammonia at a rate of about 5 cubic centimeters per second. Further treatment, starting with milling and sieving to about 325 mesh was carried out in accordance with the procedure described in Example 1. The product exhibited a Form V ammonium polyphosphate x-ray diffraction pattern similar to that shown in Example 1. It had a solubility of 0.1g/100 grams of solution, an LOI of 30.1 in Shell Epon 828 and a final pH of 7.4. The weight % phosphorus was calculated as 38 weight % $P_2O_5$ or 16.6 weight % elemental phosphorus.

EXAMPLE 6

400 grams of green wet process phosphoric acid containing 54% by weight $P_2O_5$ was concentrated by evaporation to 75% $P_2O_5$. The concentrated acid was heated to 180° C. and contacted with 200 grams of Dicalite SA-3 ™ diatomaceous earth. Further treatment starting with ammoniation of the mixture was conducted in accordance with the procedure described in Example 1. The product obtained exhibited a Form V ammonium polyphosphate x-ray diffraction pattern similar to that shown in Example 1. It had a solubility of 0.4 g/100g solution, an LOI of 30.94 in Shell Epon 828 and a final pH of 6.0. The weight % elemental phosphorus was 20.2% or 46.2% $P_2O_5$.

EXAMPLE 7

200 grams of a solid spent catalyst comprising polyphosphoric acid, containing 60% $P_2O_5$, supported on $SiO_2$ used for oligomerization reactions was ground to pass a 200 mesh screen (75 microns or less). The material was then fluidized in a glass column of about 400 ml. volume using $N_2$ gas at a flow rate of about 5 ml./sec. Ammonia gas at a flow rate of about 5 ml./sec. was then passed through the fluidized particles. The temperature rose from about 25° C. to about 85° C. within 3 minutes indicating an exothermic reaction. In 20 minutes the temperature started dropping. After 10 minutes the temperature was 38° C. and the reaction stopped. The product was then ground to pass a 325 mesh screen (44 microns or less).

The procedure was repeated with fresh catalyst. The products were analyzed for $P_2O_5$, $NH_3$, $SiO_2$, x-ray diffraction pattern, water solubility and LOI in epoxy resin (Shell Epon 828). The results are given below:

| | Fresh Catalyst | Spend Catalyst |
|---|---|---|
| $P_2O_5$, wt. % | 34 | 32 |
| $NH_3$, wt. % | 14 | 13 |
| $SiO_2$, wt. % | 41 | 40 |
| $H_2O$ Solubility[1] | 1% | 1% |
| pH[2] | 6.8 | 6.9 |
| LOI[3] | 27.8 | 27.1 |
| X-ray diffraction pattern | Form V | Form V |

[1] 10 grams of product stirred in 100 ml. of boiling water for 1 hour. The solution filtered. The solids were dried and reweighed. The difference in weight indicates solubility.
[2] pH of solution from $H_2O$ solubility.
[3] At 10 parts per hundred parts of resin (phr) loading.

EXAMPLE 8

A dry extrudate containing about 60% $P_2O_5$ was made by mixing about 480 grams of polyphosphoric acid and about 320 grams of Celite FC diatomaceous earth. The extrudates were placed into a 2½ inch diameter by 10 inch long stainless steel reactor having gas inlet and gas outlet ports. The reactor was immersed in a fluidized sand bath maintained at a temperature of about 343° C. Ammonia gas was fed through the reactor at a flow rate of about 50 cubic centimeters per second for a period of 4 hours. The product was cooled, removed from the reactor, and ground and milled to pass a 325 mesh screen. The x-ray diffraction pattern indicated a Form V ammonium polyphosphate similar to that shown in Example 1. It had a water solubility of 0.1 grams/100 grams solution, and LOI of 29.45, and a pH of 6.2. The weight % elemental phosphorus in the composition was 24.5% or 56.1% $P_2O_5$.

EXAMPLE 9

The procedure described in Example 8 was repeated except that the temperature of calcination was increased to 400° C. The product obtained did not have the x-ray diffraction pattern of Form V ammonium polyphosphate. Instead, it was characteristic of $Si_3(PO_4)_4$. The product had solubility properties of 2 grams per 100 grams of solution. This is indicative of high leachability. It had an LOI of 29.45 and a pH of 6.2.

The procedure of Example 8 was repeated again, except that the temperature of calcination was maintained at 288° C. The product obtained was wet and hygroscopic, and could not be finished into a fine, dry powder suitable for flame retardant applications.

This example thus demonstrates that calcination temperature is a very important factor in obtaining the composition of the present invention.

EXAMPLE 10

322 grams of 85% orthophosphoric acid having a concentration of 62.4% $P_2O_5$ were mixed with 150 grams of Celite FC diatomaceous earth while slowly stirring and gradually increasing the temperature to 140° C. over a period of about 30 minutes. Ammonia gas was introduced into the mixture at a flow rate of about 50 cubic centimeters per second. The ammonia contacting was continued until the heat of reaction subsided to room temperature. The reaction product was removed, placed in a 3 inch diameter stainless steel reactor, and heated at about 343° C. under a blanket of ammonia for about 4 hours. The product was milled and sieved, to pass through a screen of 325 mesh size. The product showed an x-ray diffraction pattern of a mixture of Form V ammonium polyphosphate and other forms of ammonium polyphosphate. The product was very soluble in water, having a solubility of 2.5 grams per 100 grams of solution at room temperature. The solubility was determined by stirring 10 grams of solid and 90 grams of water for one hour at room temperature. The pH was 5.1. It had an LOI of 30.6. This example demonstrates that the use of polyphosphoric acid is also of significant importance in producing the composition of the present invention.

EXAMPLE 11

The flame retardancy of the composition of Example 1 was also demonstrated in paints by preparing three formulations of paint in the following manner: 2.5 grams, 5 grams, and 10 grams of the flame retardant product of Example 1 were thoroughly contacted with 47 grams, 45 grams and 40 grams of white latex paint (Pittsburgh Paints), respectively. The three formulations were applied evenly on all surfaces of wooden tongue depressors. The painted tongue depressors were left to dry overnight. Each tongue depressor was then ignited, and the LOI was determined. The values were compared with the control and with an untreated tongue depressor. The after-glow of the burnt wood in seconds was also determined. The results have been tabulated below:

| FLAME RETARDANCY IN LATEX PAINT ON WOOD | | | | |
|---|---|---|---|---|
| | LOI | After-Glow (sec.) | Condition | Wt. % Elemental P in Paint |
| Untreated Wood | 20.6 | 120 | Ash | None |
| Control | 24.0 | 120 | Peeled & ashed | None |
| 2.5 gm. product in paint | 25.3 | 120 | Charred intact | 1.1 |
| 5 gm. product in paint | 25.4 | 60 | Charred intact | 2.2 |
| 10 gm. product in paint | 30.0 | 15 | Charred intact | 4.3 |

The wood painted with paint containing the flame retardant composition charred but remained intact and did not break down into ashes as was the case with the control and untreated wood.

What is claimed is:

1. An insoluble, flame retardant phosphorus-nitrogen-silica composition consisting essentially of:
   30–70 weight % $P_2O_5$
   1–15 weight % N
   15–50 weight % $SiO_2$
   wherein said composition exhibits x-ray diffraction pattern main identifying peaks as follows:

| X-Ray Diffraction Data (Copper K alpha radiation) | | |
|---|---|---|
| 2θ | dA° | I/Io |
| 13.13 | 6.7371 | 48 |
| 13.60 | 6.5053 | 58 |
| 16.02 | 5.5276 | 100 |
| 16.90 | 5.2417 | 44 |
| 21.80 | 4.0734 | 32 |
| 24.40 | 3.6449 | 38 |
| 26.18 | 3.4010 | 44 |

2. A method for making an insoluble, flame retardant phosphorus-nitrogen-silica composition by
   (a) impregnating diatomaceous earth with polyphosphoric acid;
   (b) ammoniating to neutralize the diatomaceous earth-polyphosphoric acid mixture; and
   (c) heating said mixture under an ammonia atmosphere to form a composition having a crystal structure similar to Form V ammonium polyphosphate.

3. The method of claim 2 wherein said heating is conducted at a temperature varying from about 300° to about 390° C.

4. The method of claim 2 wherein said heating is conducted for about 2 to about 6 hours.

5. The method of claim 3 wherein said temperature varies from about 330° to about 360° C.

6. The method of claim 2 wherein said composition is ground and milled to pass 325 mesh.

7. The product formed by the method of claim 2.

8. The method of claim 2 wherein an oligomerization catalyst comprising polyphosphoric acid, containing about 50 to about 60 weight percent $P_2O_5$, on a silica support, is substituted for Step (a).

9. The method of claim 8 wherein said catalyst is spent.

10. The product formed by the method of claim 8.

11. The product formed by the method of claim 9.

12. The method of claim 2 wherein a soluble ammonium phosphate, solution impregnated on diatomaceous earth, is substituted for Step (a).

13. The method of claim 12, wherein said solvent is water.

14. The product formed by the method of claim 12.

* * * * *